United States Patent [19]

Schiffner et al.

[11] Patent Number: 4,741,521
[45] Date of Patent: May 3, 1988

[54] AXIALLY-LOADABLE BEARING

[75] Inventors: Klaus Schiffner, Bad Neuenahr-Ahrweiler; Jörn-Rainer Quast, Sinzig; Gerd Gäb, Bad Neuenahr-Ahrweiler, all of Fed. Rep. of Germany

[73] Assignee: Boge GmbH, Eitorf, Fed. Rep. of Germany

[21] Appl. No.: 868,116

[22] Filed: May 27, 1986

[30] Foreign Application Priority Data

May 25, 1985 [DE] Fed. Rep. of Germany ....... 3519016

[51] Int. Cl.$^4$ .............................................. F16F 9/14
[52] U.S. Cl. ................... 267/140.1; 248/562; 248/636; 267/141.2; 267/293
[58] Field of Search ............... 267/140.1, 141.2, 141.4, 267/141.5, 64.11, 8 R, 63 R, 153, 63 A, 292, 293, 294; 248/562, 565, 568, 569, 636, 637, 638; 180/312

[56] References Cited

U.S. PATENT DOCUMENTS

| 2,387,066 | 10/1945 | Harding et al. | 248/358 |
| 3,245,646 | 4/1966 | Baratoff | 248/568 |
| 3,881,711 | 5/1975 | Lemaitre | 267/63 R X |
| 3,947,007 | 3/1976 | Pelat | 267/136 |
| 4,383,679 | 5/1983 | Kakimoto | 267/153 |

FOREIGN PATENT DOCUMENTS

| 2727244 | 7/1983 | Fed. Rep. of Germany . |
| 3028631 | 2/1984 | Fed. Rep. of Germany . |
| 3050710 | 2/1985 | Fed. Rep. of Germany . |
| 922441 | 6/1947 | France . |
| 0094147 | 6/1982 | Japan | 267/140.1 |

Primary Examiner—George E. A. Halvosa
Assistant Examiner—Matthew C. Graham
Attorney, Agent, or Firm—Nils H. Ljungman

[57] ABSTRACT

Axially and radially-loadable bearing which damps in an axial direction for elastic mounting of machines, machine parts, and/or vehicle parts. This bearing has an outer part and two elastomeric or rubber springs located between an inner, often rotating, part and an outer part, which form a cavity area which is preferably filled with damping fluid and in which there is a partition separating the cavity into two chambers. The partition comprises a rigid sliding part guided on the inner part and a rigid fastening part connected in a fixed manner to the outer part. The two rigid parts are connected to one another by means of an elastomeric or rubber thrust washer. Preferably, there is a throttle in at least one of the rigid parts. As a result of the arrangement of a rubber thrust washer between the sliding part and the fastening part, the bearing can absorb radial and Cardan motions at the same time as it absorbs axial loads without jamming, and without the occurrence of a appreciable change of the throttle opening cross-sectional area.

20 Claims, 2 Drawing Sheets

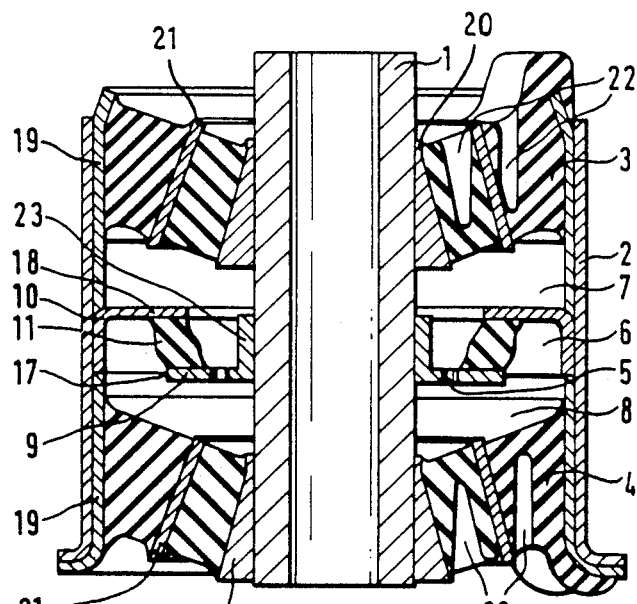
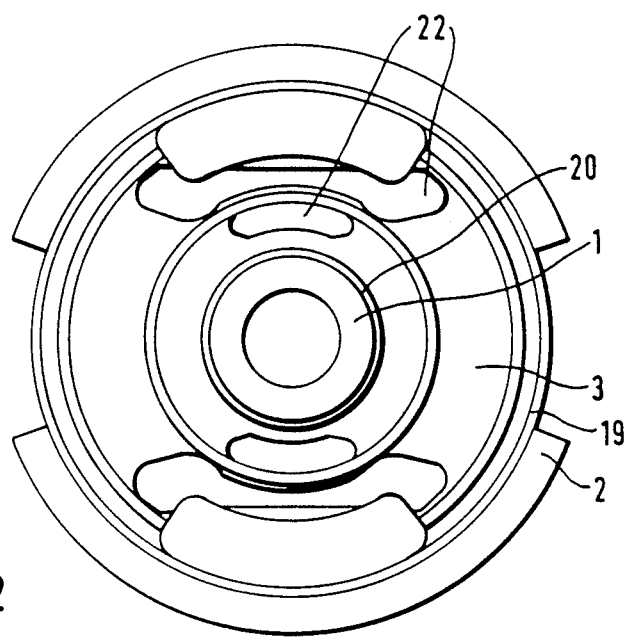

AXIALLY-LOADABLE BEARING

BACKGROUND OF THE INVENTION

1. Field of the Invention:

This invention relates generally to bearings and, more specifically to a bearing which can be loaded axially and radially for the elastic mounting of machines, machine parts, and/or vehicle parts.

The bearing according to embodiments of the invention comprises an inner part and an outer part located at some distance therefrom. Additionally, two rubber springs are disposed between the internal and external parts, whereby the rubber springs form a circular annulus filled with damping fluid. An annular partition exhibiting a throttle separates the annulus into two annular spaces.

2. Description of the Prior Art:

Bearings are known, such as in Federal Republic of Germany Pat. No. DE-PS 30 28 631, Federal Republic of Germany Pat. No. DE-PS 30 50 710 and French Patent Specification No. FR-PS 922 441, in which an axially-loaded rubber sleeve spring for the elastic mounting of machines or machine parts comprises a smooth inner sleeve and an outer sleeve, and in which the rubber springs form a circular annulus filled with damping fluid, which two annular chambers separated from one another by a circular partition and which are in communication with one another via a circular throttle orifice. These bearings can absorb torsional and oblique stresses, and such a bearing provides, in addition to an axially elastic mounting to prevent resonance oscillations with large amplitudes, an additional integrated hydraulic damping to absorb impacts introduced axially. The two chambers are in communication with one another by means of a throttle opening, which is limited on one side by the partition made of a plastic material, and on the other side by the neighboring internal wall of the cavity. In such bearings, however, Cardan motion stresses, which can have an unfavorable effect on the throttle opening, can occur, so that there is no longer an exactly uniform hydraulic damping.

In addition, axially-loaded bearings comprising a number of component bearings are known, such as in U.S. Pat. No. 3,947,007, in which the throttle cross section remains constant, even with superimposed Cardan motions, but these bearings have sliding parts which are unnecessarily complicated and are subject to rapid wear. Such sliding parts, which have tight clearances, are subject to jamming and tilting out of position, in use, when there are axial and superimposed Cardan motions. Also, when there is excessive play in these bearings, gaps between the sliding parts allow damping fluid to flow therethrough. These gaps are undefinable in cross-section and they may vary unpredictably. Such unpredictable operation can adversely affect the throttling action of these prior art bearings.

All of the above-cited patent publications are incorporated herein by reference as if set forth herein in their entirety.

OBJECTS OF THE INVENTION

An object of the invention is to provide a simple, economical, axially-loadable bearing.

A further object of the invention is to provide a bearing which has only a few low-wear parts.

A yet further object of the invention is to provide a bearing which can absorb radial and Cardan motions without problems and without jamming up.

A still further object of the invention is to provide a bearing which has a throttle opening which maintains a substantially exact or constant cross section area for substantially constant and predictable throttling action during use.

SUMMARY OF THE INVENTION

These objectives are achieved by embodiments of the invention, in that the partition has a rigid sliding part guided on the inner part, a rigid fastening part connected with the outer part, and a rubber or elastomeric thrust washer fixed to the sliding part and to the fastening part. The throttle opening is formed by one of the rigid parts.

An advantage with this configuration is that, when the throttle is located in one of the rigid parts, constant conditions for the damping preferably always prevail. The elastic connection of the sliding part and of the fastening part, by means of the rubber thrust washer, preferably assures an axial damping, whereby a simultaneous radial and Cardan motion deflection of the rubber bodies can be absorbed, without the occurrence of a jamming or tipping of the partition, or variable and thus undefinable openings forming the throttle. In addition, there is no appreciable wear on the components which must be compensated for.

In accordance with another important embodiment of the invention, the sliding part and/or the fastening part has bends thereon which results in an angular cross-section. Thereby, the rubber or elastomeric thrust washer can be located so that it extends axially.

In a simple, economical embodiment of the partition, the throttle is designed as a hole in the sliding portion and/or the fastening part.

One embodiment of the invention provides that the throttle comprises at least one groove, channel, or similar passage running between the inner part and the sliding part. The channel can therefore be a component of the sliding part or of the inner part.

In another embodiment of the partition, the throttle is designed as a bearing clearance of the sliding part guided on the inner portion.

To reduce resonances and/or to achieve a phase shift during damping, an especially advantageous embodiment provides that the duct run helically around the inner portion, and be located in the inner surface of the sliding part.

A completely fluid-tight seal between the sliding portion and the fastening portion is assured, if the rubber thrust washer is vulcanized to the region of the ends of the rigid parts facing one another.

In one embodiment of the invention, the rubber thrust washer can be connected in a fixed but removable manner with the sliding part and the fastening part. Such a connection, for example, could be made by fitting the rubber thrust washer in grooves of the corresponding parts to be connected.

In addition, the sliding portion can also be guided on the inner part by means of a friction bearing.

The invention resides broadly in a hydraulically damped bearing which is substantially cylindrical and has a substantially longitudinal, axially directional axis and a substantially radial direction substantially at right angles to the longitudinal axis. The bearing is loadable both substantially axially and substantially radially. The bearing hydraulically damps along the axial direction, in use, and can be mounted with at least one of the following: elastic mounting for machinery, machine parts, or vehicle components. The bearing comprises inner means and outer means, the outer means being disposed at a given distance from the inner means, and first and second substantially resilient means disposed between the inner and outer means. The first and second resilient means form a substantially annular cylindrical space for being filled with and for containing damping fluid. There are annular divider means disposed in the annular space which divide the space into two substantially annular chambers, each being disposed adjacent the other and both being disposed axially along the longitudinal axis. The annular divider means comprises a rigid sliding portion disposed to be slidable, in operation, on the inner means. There is also provided third, at least partially resilient, means having a portion connected with the outer means and a portion connected with the inner means and at least one throttle orifice having substantially constant cross-sectional dimensions, which is disposed in at least one of the rigid sliding portion and the third, at least partially resilient means when the third means has at least one non-resilient rigid portion. The throttle orifice then is also disposable in the at least one non-resilient rigid portion of the third means, whereby substantially constant damping of the bearing is produced.

BRIEF DESCRIPTION OF THE DRAWINGS

Preferred embodiments of the invention are illustrated schematically in the drawings, in which:

FIG. 1 shows a side view, in cross-section, of an axially-loadable bearing according to an embodiment of the invention;

FIG. 2 shows a top view of the bearing illustrated in FIG. 1; and

DETAILED DESCRIPTION OF THE PREFERRED EMBODIMENTS

Figure 3:
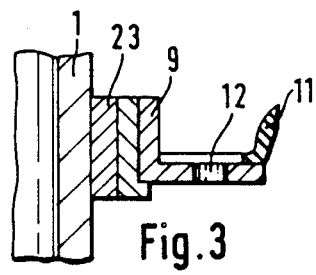
FIGS. 3, 4, 5, 6, 7, 8, and 9 show details of the sliding part and one appropriate form of a throttle in cross-section.

FIG. 1 shows an axially and radially-loadable bearing which damps hydraulically in the axial direction. This bearing has an inner part 1, such as a rotating or other shaft member, an outer part 2, and elastomeric spring elements or rubber springs 3 and 4. The elastomeric or rubber springs 3 and 4 are preferably vulcanized in their external portions each to a pair of preferably cylindrical sheet metal parts 19. The springs 3 and 4 are preferably vulcanized at their inside diameters each to its one of a pair of rings 20. The sheet metal part 19 is used to achieve a rigid mounting in relation to an external sleeve or the outer part 2, whereby the ring 20 is pressed against the inner part 1 thereby containing and sealing damping fluid into the bearing. In addition, there can be reinforcement plates 21 disposed in the rubber springs 3 and 4 for, among other uses, the stiffening thereof.

An annular fastening part 10 is retained in the axial direction between and preferably by the sheet metal parts 19 of the rubber springs 3 and 4. By means of the fastening part 10, a rubber thrust washer 11, and a sliding part 9, a cavity between the inner part 1 and the outer sleeve 2 is divided into two annular spaces 7 and 8. These annular spaces 7 and 8 are preferably filled with damping fluid. A partition 6, comprising the sliding part 9, the fastening part 10, and the rubber thrust washer 11, allows a fluid exchange between the annular spaces 7 and 8 preferably exclusively via the orifice or throttle opening 5. The sliding part 9 is axially guided on the inner part 1 by the elastic rubber thrust washer 11, so that no tipping or jamming of the sliding part 9, in intended operation, can occur, even with superimposed radial and Cardan motion movements. The axial loads are absorbed by deflection, so that as a result of a change in the volume of one or both of the annular spaces 7 or 8, the damping fluid will flow through the throttle 5 into the adjacent annular space, thereby compensating for the change in volume.

To achieve different characteristics, there are also recesses 22 located in the rubber springs 3 and 4, which, depending on their configuration, provide a softening of the suspension characteristics of the bearing. At points on the circumference of the springs 3 and 4 where there are no recesses such as 22, harder suspension characteristics which are preferably radial are present. However, it is also possible to have these recesses 22 extend completely about the entire circumference, thereby providing substantially constant suspension characteristics in at least most directions.

In the view shown in FIG. 2, the inner portion 1 is surrounded by the rubber spring 3, whereby the outer portion 2 is connected with the rubber springs 3 via the sheet metal parts 19 and an inner sleeve portion of the springs 3 via the ring 20. The inner portion 1 is usually fastened to the machine or vehicle part.

The embodiment of FIGS. 1 and 2 is shown substantially full size. The sizes of the components in the drawings are preferably dimensionally correct and accurate and may be used to define all the dimensions of one embodiment of the invention. However, the bearing may be made larger or preferably smaller depending upon the size of the inner part or shaft 1. A bearing surface 23 between the inner part 1 and the sliding part 9 is typically 7/16 of an inch in the axial direction which provides a large area and length, whereby twisting and other movements will not readily jam the movement of the sliding part 9. The length of this bearing surface 23 may be in the order of about an eighth of an inch or less and up to several eights of an inch, and possibly even an inch or more in large bearings.

Referring now to the next drawing, FIG. 3 shows a detail of a portion of the inner part 1, whereby the sliding part 9 provides the throttle 5 of FIG. 1 in the form of a hole 12. The elastomeric or rubber thrust washer 11 is indicated only partly. The angularly annular sliding part 9 is guided preferably on the inner part 1 by means of a friction bearing 23. This friction bearing 23 may be made, for example, of Teflon/bronze or plastic, bronze, or steel with a clearance therebetween and the inner, often rotating, part 1.

Figure 4:
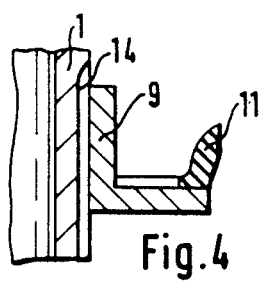

FIG. 4 shows another embodiment, in which the sliding part 9 is guided on the inner part 1 and the throttle is designed as a channel 14 preferably in the inner part 1. This channel 14 runs on the outer surface of the inner part 1, while the sliding part 9 has a cylindrical inner hole.

Figure 5:
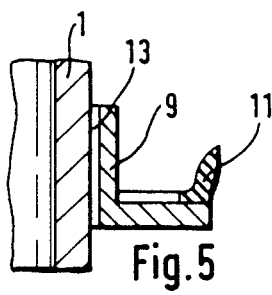
Figure 6:
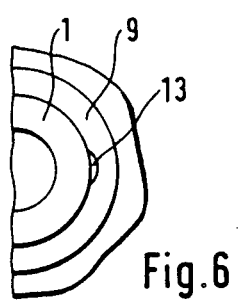

FIGS. 5 and 6 again show a sliding part 9, which is guided on the inner part 1, whereby the throttle is shown to comprise or consist of one or more axially oriented grooves 13 distributed over the circumference of the sliding part 9.

Figure 7:
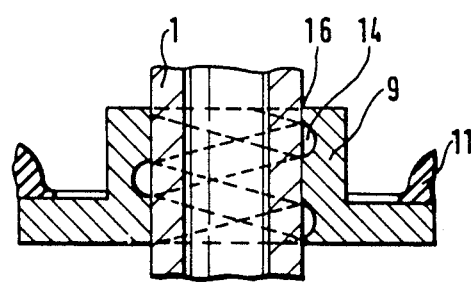

In FIG. 7, too, there is a channel 14, which corresponds to the throttle 5 of FIG. 1, in the sliding part 9, but which runs around on the cylindrical inner surface 16 of the sliding part 9 with a helical inclination around the inner part 1. The inclination and the cross-section of the channel 14 can thereby vary according to the throttling action desired, which can be designed to damp out a specific frequency or a range of specific vibrations, depending upon the cross-sectional area, length, and even the inclination of the channel 14, and also the damping medium used.

Figure 8:
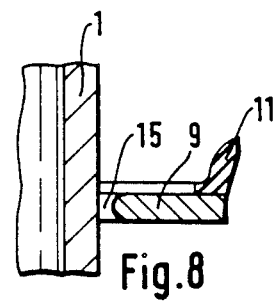
Figure 9:
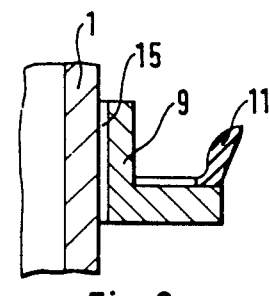

FIG. 8 shows, between the inner part 1 and the sliding part 9, an opening 15 as a throttle, whereby this opening 15 can be designed to produce a required damping action. This opening 15 may extend around the inner part 1 or preferably at only one location, as the groove 13 in FIG. 6. FIG. 9, on the other hand, is provided with a bearing clearance 15, which extends over the entire axial length of the sliding part 9. In all embodiments of FIGS. 3 to 9, there is preferably a vulcanization of the rubber thrust washer 11 attached to the sliding part 9.

In a further embodiment of the invention, according to the FIG. 9, the sliding part 9 has an inner surface disposed adjacent the inner part 1, and at least one channel 15 having an inner surface disposed adjacent the inner part 1.

Referring once again to FIG. 7, the channel 14 is disposed helically about the inner part 1 and is located in the inner surface of the sliding part 9, whereby damping of the bearing is related to a length and a cross-sectional area of the channel 14.

When the word "rubber" is used hereinabove, elastomers, such as neoprene, are preferably included in the meaning thereof.

The invention as described hereinabove in the context of the preferred embodiments is not to be taken as limited to all of the provided details thereof, since modifications and variations thereof may be made without departing from the spirit and scope of the invention.

What is claimed is:

1. A hydraulically damped bearing which is substantially cylindrical and has a substantially longitudinal axially directional axis and a substantially radial direction substantially at right angles to said longitudinal axis, said bearing being loadable both substantially axially and subtantially radially, said bearing for hydraulically damping, in use, along said substantially axial and substantially radial directions
said bearing comprising:
inner means;
outer means disposed at a given distance from said inner means;
first and second substantially resilient means disposed between said inner means and said outer means;
said first and second resilient means forming a substantially annular cylindrical space for being filled with and for containing damping fluid;
annular divider means being disposed in said annular space to divide said annular space into two substantially annular chambers, each of said chambers being disposed adjacent the other and both being disposed axially along said longitudinal axis;
said annular divider means comprising a rigid sliding portion disposed to be slidable, in operation, on said inner means;
said annular divider means additionally comprising a thrust washer innerconnecting said rigid sliding portion and said outer means, said thrust washer being substantially ring shaped and being disposed with its major longitudinal axis of extension substantially parallel to said longitudinal axis of said bearing; and
at least one throttle orifice provided through said annular divider means and interconnecting said two annular chambers.

2. The bearing according to claim 1, wherein said rigid sliding portion includes a cylindrical, first portion which has a longitudinal axis;
said longitudinal axis of said rigid sliding portion being substantially aligned with said longitudinal axis of said bearing; and
a second portion of said rigid sliding portion being disposed radially and at substantially right angles with said first portion of said rigid sliding portion.

3. The bearing according to claim 2, wherein said thrust washer has a non-resilient rigid portion;
said non-resilient rigid portion of said thrust washer having a cylindrical portion which has a longitudinal axis that is substantially aligned with said longitudinal axis of said bearing; and
said non-resilient rigid portion of said thrust washer having an annular portion disposed substantially radially and at substantially right angles to said longitudinal axes of said bearing and said cylindrical portion.

4. The bearing according to claim 3, wherein said at least one throttle orifice comprises a hole.

5. The bearing according to claim 4, wherein said hole is disposed in said rigid sliding portion.

6. The bearing according to claim 5, wherein said thrust washer comprises an elastomeric thrust washer which is vulcanized to a portion of said rigid sliding portion and also to means attached to said outer means.

7. The bearing according to claim 5, wherein said thrust washer comprises an elastomeric thrust washer which is firmly, but removably, connected to said rigid sliding portion and also to means attached to said outer means.

8. The bearing according to claim 1, wherein said thrust washer has a non-resilient rigid portion;
said non-resilient rigid portion of said thrust washer having a cylindrical portion which has a longitudinal axis that is substantially aligned with said longitudinal axis of said bearing; and
said non-resilient rigid portion of said thrust washer having an annular portion disposed substantially radially and at substantially right angles to said longitudinal axes of said bearing and said cylindrical portion.

9. The bearing according to claim 1, wherein said throttle orifice comprises at least one of the members of the group consisting essentially of:
at least one groove and at least one channel;
said at least one member of said group being disposed between said inner means and said rigid sliding portion.

10. The bearing according to claim 9, wherein said channel is an integral part of a member of the group consisting essentially of said rigid sliding portion and said inner means.

11. The bearing according to claim 9, wherein said rigid sliding portion has an inner surface disposed adjacent to said inner means and wherein said at least one channel comprises a channel having an inner surface disposed adjacent said inner means and wherein said channel is disposed helically about said inner means and is located in said inner surface of said rigid sliding portion, whereby damping of said bearing is related to a length and a cross-sectional area of said channel.

12. The bearing according to claim 1, wherein said rigid sliding portion includes a bearing surface and said throttle orifice comprises a clearance between said bearing surface of said rigid sliding portion and said inner means.

13. The bearing according to claim 12, wherein said thrust washer comprises an elastomeric thrust washer which is vulcanized to a portion of said rigid sliding portion and also to means attached to said outer means.

14. The bearing according to claim 1, wherein said thrust washer comprises an elastomeric thrust washer which is vulcanized to a portion of said rigid sliding portion and also to means attached to said outer means.

15. The bearing according to claim 1, wherein said thrust washer comprises an elastomeric thrust washer which is firmly, but removably, connected to said rigid sliding portion and also to means attached to said outer means.

16. The bearing according to claim 1, wherein said rigid sliding portion comprises a friction bearing being disposed adjacent said inner means and for making bearing contact therewith during operation.

17. The bearing according to claim 1, wherein said inner means comprises a cylindrical, elongated member and said outer means comprises a cylindrical, elongated sleeve.

18. The bearing according to claim 1, wherein said inner means is a throughgoing shaft.

19. The bearing according to claim 18, wherein said throughgoing shaft is rotatable.

20. A hydraulically damped bearing which is substantially cylindrical and has a substantially longitudinal axially directional axis and a substantial radial direction substantially at right angles to said longitudinal axis, said bearing being loadable both substantially axially and substantially radially, said bearing for hydraulically damping, in use, along said substantially axial and substantially radial directions, said bearing comprising:
a throughgoing rotatable shaft;
outer means disposed at a given distance from said throughgoing rotatable shaft;
first and second substantially resilient means disposed between said throughgoing rotatable shaft and said outer means;
said first and second resilient means forming a substantially annular cylindrical space for being filled with and for containing damping fluid;
annular divider means being disposed in said annular space to divide said annular space into two substantially annular chambers, each of said chambers being disposed adjacent the other and both being disposed axially along said longitudinal axis;
said annular divider means comprising a rigid sliding portion disposed to be slidable, in operation, on said throughgoing rotatable shaft;
said annular divider means additionally comprising a resilient portion interconnecting said rigid sliding portion and said outer means; and
at least one throttle orifice interconnecting said two annular chambers.

* * * * *